US008458681B1

(12) United States Patent
Coutant et al.

(10) Patent No.: US 8,458,681 B1
(45) Date of Patent: *Jun. 4, 2013

(54) METHOD AND SYSTEM FOR OPTIMIZING THE OBJECT CODE OF A PROGRAM

(75) Inventors: Cary A. Coutant, Saratoga, CA (US);
Christopher G. Demetriou, Redwood City, CA (US)

(73) Assignee: Google Inc., Mountain View, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 12/495,649

(22) Filed: Jun. 30, 2009

(51) Int. Cl.
*G06F 9/45* (2006.01)

(52) U.S. Cl.
USPC ........... 717/151; 717/124; 717/127; 717/128; 717/129; 717/131

(58) Field of Classification Search
USPC .................................................. 717/151, 153
See application file for complete search history.

(56) References Cited

U.S. PATENT DOCUMENTS

| | | | | |
|---|---|---|---|---|
| 5,327,562 | A * | 7/1994 | Adcock .......................... | 717/141 |
| 5,713,010 | A * | 1/1998 | Buzbee et al. ................. | 717/124 |
| 5,799,302 | A * | 8/1998 | Johnson et al. ........................ | 1/1 |
| 6,374,235 | B1 * | 4/2002 | Chen et al. ............................ | 1/1 |
| 7,607,123 | B2 * | 10/2009 | Chavan ......................... | 717/129 |
| 2006/0064676 | A1 | 3/2006 | Chavan et al. | |
| 2009/0241098 | A1 * | 9/2009 | Lobo et al. ..................... | 717/165 |
| 2012/0030652 | A1 * | 2/2012 | Jelinek .......................... | 717/124 |

OTHER PUBLICATIONS

An Interactive High-Level Debugger for Control-Flow Optimized Programs by Zellweger.*
Zellweger, "An Interactive High-Level Debugger for Control-Flow Optimized Programs", Jan. 1983.*
Dwarf Workgroup, "DWARF Debugging Information Format Version 3", Dec. 20, 2005.*
Anonymous, DWARF Debugging Information Format Version 3, Dec. 20, 2005, 267 pages.

* cited by examiner

*Primary Examiner* — Chat Do
*Assistant Examiner* — Jae Jeon
(74) *Attorney, Agent, or Firm* — Morgan, Lewis & Bockius LLP

(57) ABSTRACT

A method for optimizing the object code of a program is disclosed. A compiler generates, respectively, first and second object code segments for first and second source code segments of the program. If the two object code segments are determined to be identical, the compiler generates first and second debugging information entries in a compilation unit of the program and both entries include information for locating the first object code segment. The compiler inserts two entries into a call table in the compilation unit, each entry including information for locating a respective call site that invokes a respective source code segment within a call stack of the program and information for locating a respective debug information entry. The call table is used for associating an operation within the first object code segment with one of the first and second source code segments at runtime.

17 Claims, 13 Drawing Sheets

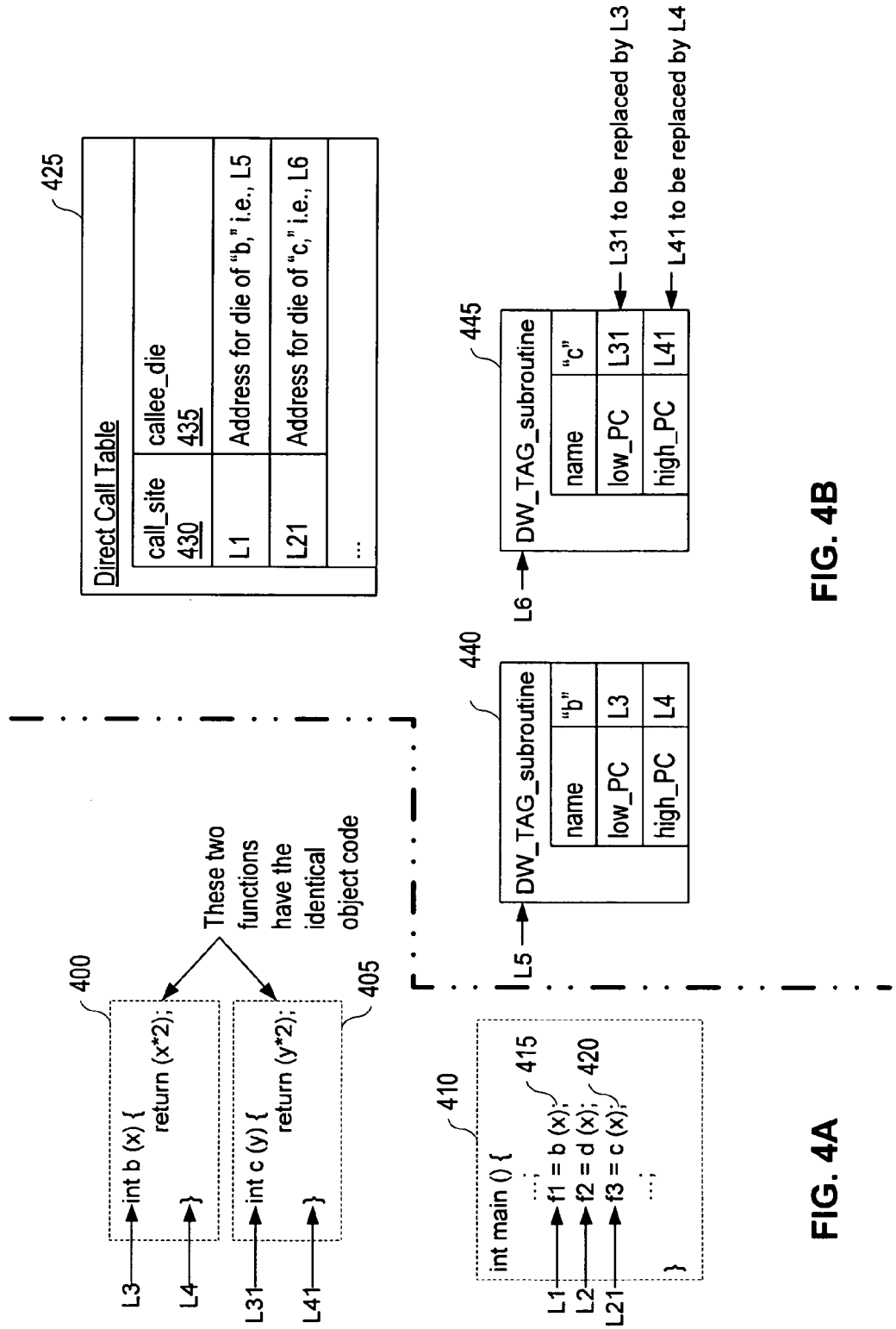

Compile Time:

Direct Call Table (450)

| call_site | callee_debug_information_entry |
|---|---|
| L1 | Address for debug info of "b" (L5) |
| L2 | Address for debug info of "d" (...) |
| L21 | Address for debug info of "c" (L6) |
| ... | |

← This entry is removed at link time because there is no merge or ambiguity

Link Time:

Direct Call Table (460)

| call_site | callee_debug_information_entry |
|---|---|
| L1 | Address for debug info of "b" (L5) |
| L21 | Address for debug info of "c" (L6) |
| ... | |

FIG. 4C

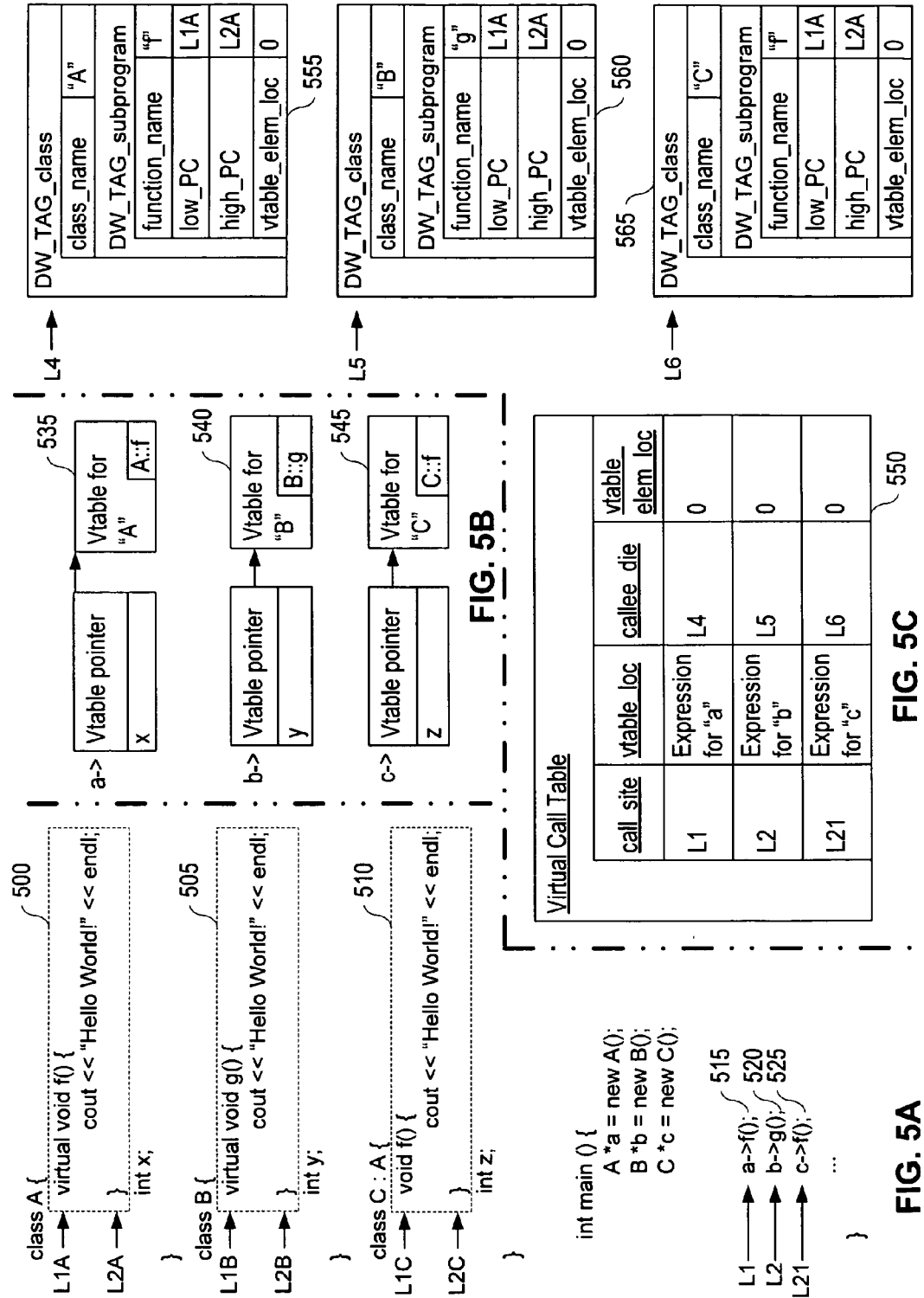

METHOD AND SYSTEM FOR OPTIMIZING THE OBJECT CODE OF A PROGRAM

RELATED APPLICATIONS

This application is related to co-pending, commonly-assigned U.S. Utility patent application Ser. No. 12/495,625, filed on Jun. 30, 2009 the contents of which are incorporated by reference herein in their entirety.

TECHNICAL FIELD

The disclosed embodiments relate generally to program compilation and debugging, and in particular, to a system and method for optimizing the object code of a program at compile time.

BACKGROUND

At compile time, a compiler may generate multiple copies of an identical object code segment for a program written in a specific programming language. This can occur when different functions in the program source code have the same object code representation, even if the functions are different. In such a situation, the program object code can be optimized by merging the identical object code segments into a single copy of the object code. A benefit from merging these identical object code segments into a single copy is a reduction in size of the executable of the program. But the merge causes a problem for debugging the program as a program counter (PC) associated with the merged object code segment no longer corresponds to a unique segment in the source code of the program.

SUMMARY

In accordance with some embodiments described below, a method for optimizing the object code of a program is disclosed. The method includes generating, respectively, a first object code segment for a first source code segment and a second object code segment for a second source code segment, wherein the first source code segment is invoked by a first call site and the second source code segment is invoked by a second call site in the program; determining that the first object code segment is identical to the second object code segment; generating in a compilation unit of the program, respectively, a first debugging information entry for the first source code segment and a second debugging information entry for the second source code segment, wherein both the first and second debugging information entries include information for locating the first object code segment; and inserting into a call table in the compilation unit, respectively, a first entry for the first call site and a second entry for the second call site, wherein the first entry includes information for locating the first call site within a call stack of the program and information for locating the first debug information entry and the second entry includes information for locating the second call site within the call stack and information for locating a second debugging information entry, such that an operation within the first object code segment at runtime is uniquely associated with one of the first and second source code segments by a corresponding entry in the call table.

In accordance with some embodiments described below, a system for processing a computer program includes one or more central processing units for executing programs; and memory to store data and to store one or more programs to be executed by the one or more central processing units. The one or more programs include instructions for: generating, respectively, a first object code segment for a first source code segment and a second object code segment for a second source code segment, where the first source code segment is invoked by a first call site and the second first source code segment is invoked by a second call site in the program; determining that the first object code segment is identical to the second object code segment; generating in a compilation unit of the program, respectively, a first debugging information entry for the first source code segment and a second debugging information entry for the second source code segment, wherein both the first and second debugging information entries include information for locating the first object code segment; and inserting into a call table in the compilation unit, respectively, a first entry for the first call site and a second entry for the second call site, wherein the first entry includes information for locating the first call site within a call stack of the program and information for locating the first debug information entry and the second entry includes information for locating the second call site within the call stack and information for locating a second debugging information entry, such that an operation within the first object code segment at runtime is uniquely associated with one of the first and second source code segments by a corresponding entry in the call table.

In accordance with some embodiments described below, a computer readable-storage medium stores one or more programs for execution by one or more processors of a computer system. The one or more programs include instructions for: generating, respectively, a first object code segment for a first source code segment and a second object code segment for a second source code segment, where the first source code segment is invoked by a first call site and the second first source code segment is invoked by a second call site in the program; determining that the first object code segment is identical to the second object code segment; generating in a compilation unit of the program, respectively, a first debugging information entry for the first source code segment and a second debugging information entry for the second source code segment, wherein both the first and second debugging information entries include information for locating the first object code segment; and inserting into a call table in the compilation unit, respectively, a first entry for the first call site and a second entry for the second call site, wherein the first entry includes information for locating the first call site within a call stack of the program and information for locating the first debug information entry and the second entry includes information for locating the second call site within the call stack and information for locating a second debugging information entry, such that an operation within the first object code segment at runtime is uniquely associated with one of the first and second source code segments by a corresponding entry in the call table.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

FIGS. 4A to 4C depict an example of debugging information and a direct call table for merged functions in a C program in accordance with some embodiments.

FIGS. 5A to 5C depict an example of debugging information and a virtual call table for merged functions in a C++ program in accordance with some embodiments.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Program debugging is an important component of software development. A source code-level debugger is particularly useful because it allows a developer to perform operations such as stepping through a program's source code, setting breakpoints therein, printing variable values, and calling a function in the program while in the debugger. To support these functionalities, a compiler (sometimes in conjunction with a linker) needs to collect information about the relationship between an executable program and the original source code with enough detail and describe the relationship in a format that is reasonably efficient for a debugger to process.

Figure 1:
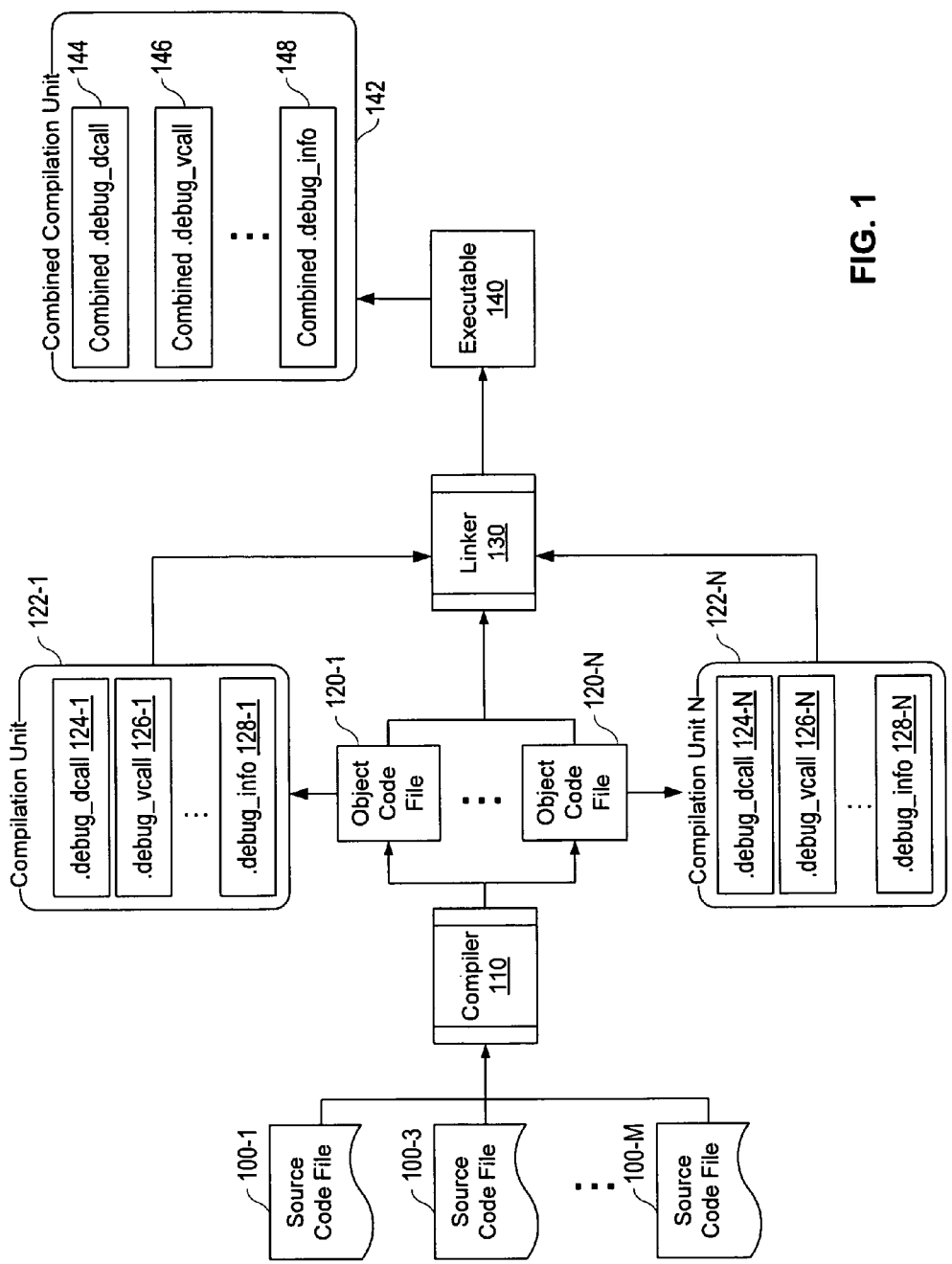
FIG. 1 is an overview block diagram of a process for transforming source code of a program into an executable in accordance with some embodiments.

FIG. 1 is an overview block diagram of a process for transforming the source codes of a program into an executable and generating associated debugging information in accordance with some embodiments.

In some embodiments, the program's source codes may be stored within one or more source code files 100-1 to 100-M.

A compiler 110 transforms the source code files into one or more object code files 120-1 to 120-N. The process of compiling a program from a human-readable format such as source code into the binary format that a processor executes involves successively transforming the source code into simpler forms and discarding redundant information at each step until the result is a sequence of simple operations, registers, memory addresses, and binary values that the processor can understand. During this process, instructions within one source code file may be distributed over multiple object code files and instructions within multiple source code files may be merged into a single object code file.

In some embodiments, the compiler 110 further includes a code optimizer for moving parts of the program around, combining similar pieces, or removing parts that are unneeded, and a code generator that takes the intermediate representation of the program and generates the actual machine code. In computer science, the term "intermediate representation" typically refers to a data structure that is constructed from input data to a program, and from which part or all of the output data of the program (i.e., machine code) is constructed. The intermediate representation of a program is a language-neutral expression. Most of the information present in the input is retained by the intermediate representation, with further annotations or rapid lookup features. Sometimes, the compiler (sometimes in cooperation with a linker) makes another pass over the machine code to perform further optimizations, such as further rearranging or modifying the machine code to eliminate, e.g., duplicate instructions.

As the compiler 110 parses the source code of a program, it collects a variety of information about the program that may be useful for subsequent program debugging, such as the line numbers where a variable or function is declared or used, the types of variables and arguments of functions. To facilitate the use of the debugging information, as shown in FIG. 1, the compiler 110 organizes the debugging information in a pre-defined format and stores it in a predefined data structure. For illustration, the present application describes examples using the widely-adopted standardized debugging format, DWARF, which is an acronym for "Debugging With Attributed Record Formats." A detailed description of the formation is available in "DWARF Debugging Information Format Version 3," published Dec. 20, 2005 at http://dwarfstd.org/Dwarf3Std.php, the content of which is incorporated by reference in its entirety.

According to DWARF, an object file may have one or more compilation units for storing related debugging information. For illustration, an object file 120-1 or 120-N in FIG. 1 is associated with one compilation unit 122-1 or 122-N. A compilation unit typically represents the text and data contributed to an executable by a single object file. It may be derived from several source code files, including pre-processed "include files."

Within a compilation unit 122-1 or 122-N, the debugging information is organized under different sections. Each section includes a compilation unit header followed by data about the corresponding compilation unit. In some embodiments, the header provides, at minimum, an indication of the length of the compilation unit so that it is still possible to identify separate compilation units after multiple compilation units are combined into a single one by the linker 130 and an indication of the size of an address for the target machine code if the data contains address-sized objects.

FIG. 1 depicts that a compilation unit includes at least three sections, a .debug_dcall section (124-1 or 124-N) for storing a direct call table, a .debug_vcall section (126-1 or 126-N) for storing a virtual call table, and a .debug_info section (128-1 or 128-N) for storing other debugging information. In some embodiments, the .debug_info section includes one or more debugging information entries to define a low-level representation of a source code program. Each debugging information entry (DIE) is described by an identifying tag and contains a set of attributes. The tag specifies the class to which an entry belongs, and the attributes define the specific characteristics of the entry. Exemplary call tables and DIEs are described below in connection with FIGS. 4A-4C and 5A-5C, respectively.

The linker 130 is a program that takes the one or more object files 120-1, 120-N generated by the compiler 110 and combines them into a single executable program 140. With regard to the debugging information, the linker 130 combines the one or more compilation units 122-1, 112-N into a single combined compilation unit 142. The combined compilation unit 142 includes a combined .debug_dcall section 144, a combined .debug_vcall section 146, and a combined .debug_info section 148, each of which is a combination of the counterpart sections in the respective object files 120-1, 120-N.

Object Code Optimization

As noted in the background section, a compiler may generate multiple copies of identical object code segments for different source code segments. Although it is possible to eliminate those duplicate copies at compile time and therefore reduce the size of the executable, this benefit is associated with a downside that may prevent an application such as a debugger or a profiler from uniquely identifying a source code segment corresponding to a particular execution of the object code segment. For example, if a compiler (or linker) merges two identical object code segments O1 and O2 for respective source code segments S1 and S2 into the single object code segment O12, using conventional debugger information a debugger hitting a break point in the object O12 would not be able to unwind that break point to the correct corresponding source code segment, S1 or S2. According to various embodiments of the present invention, an approach to avoiding this downside is to generate additional debugging information in a corresponding compilation unit for the different source code segments that correspond to the same object code segment. In some embodiments, this additional debugging information includes information identifying for each merged object code segment the respective source code segments from which the merged object code segment is called, which allows, among other things, break points in merged objects to be unwound in a debugger. For simplicity, the present application uses a code segment that is invoked or called as a unit by other codes as a target for merging. An exemplary code segment unit in different computer programming languages may be referred to as a function, a subroutine, a subprogram, a procedure, a method, or a routine, etc. But it will be apparent to one skilled in the art that the present invention can be applied to other scenarios where there is no well-defined code segment unit.

Figure 2A:
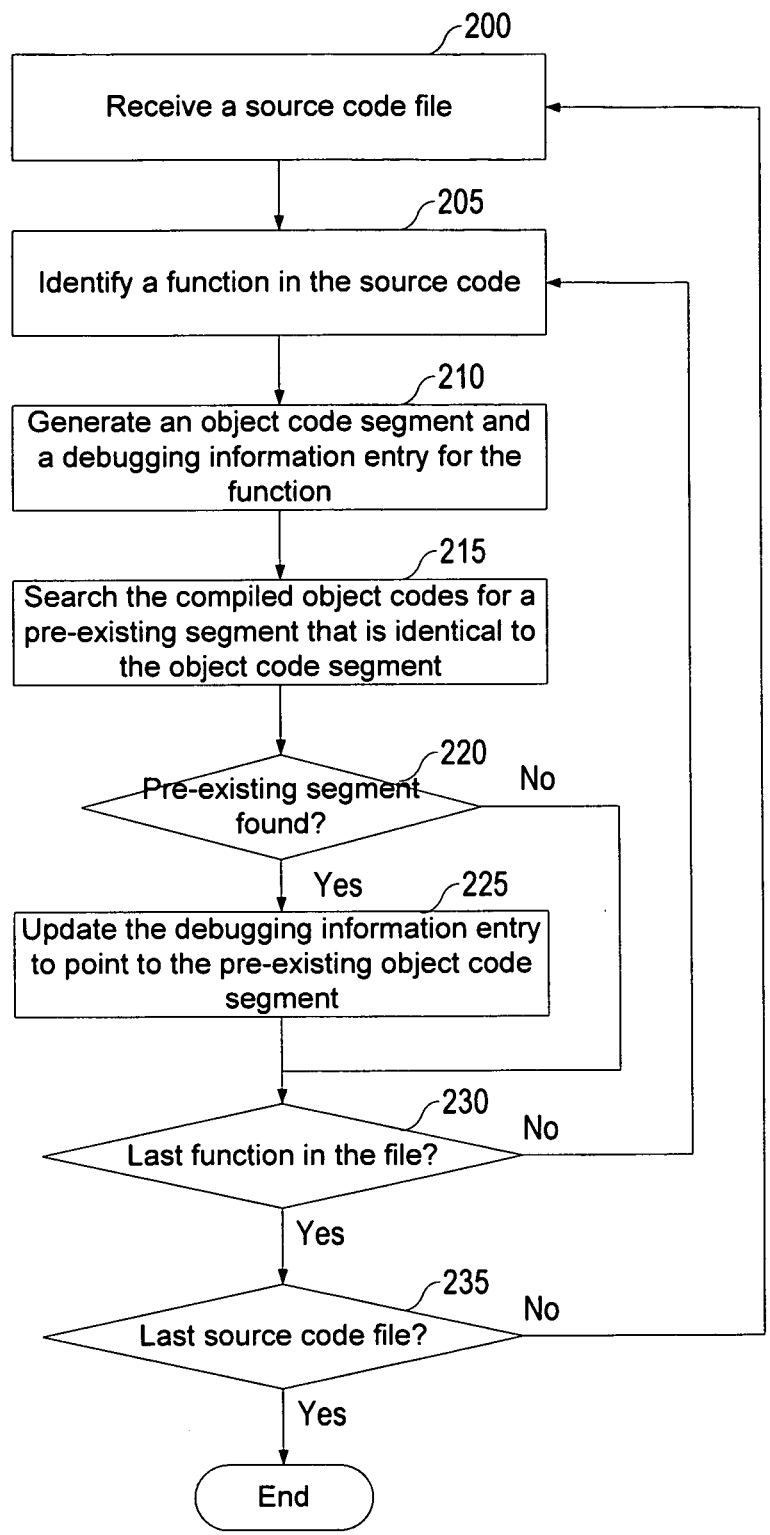
FIG. 2A is a flow chart of a process for generating debugging information entries for merged functions in accordance with some embodiments.

FIG. 2A is a flow chart of a process for generating debugging information entries for merged functions in accordance with some embodiments. In some embodiments, the process disclosed in FIG. 2A is implemented in a compiler, such as the compiler 1020 described below in connection with FIG. 10.

Upon receiving a source code file (200), the compiler identifies a function in the source code (205). A function is typically a portion of code within a larger program, which performs a specific task and is relatively independent of the remaining code. Exemplary functions include the C functions b(x) 400 and c(y) 405 shown in FIG. 4A. Note that although the two functions are configured to perform identical operations, they are not the same at the source code level because, at minimum, the variable of the function b(x) is expressed using the character "x" whereas the variable of the function c(y) is expressed using the character "y."

For the identified function, the compiler generates an object code segment and a corresponding debugging information entry (210). Although two functions are not identical at the source code level, the compiler may generate identical object code for them because they are configured to perform identical operations. In some embodiments, the debugging information entry of each function is stored in the .debug_info section of a corresponding compilation unit. FIG. 4B depicts two such entries, a DIE 440 that corresponds to the function b(x) and a DIE 445 that corresponds to the function c(y).

In this example, each of the two DIEs begins with a code that represents an entry in a separate abbreviations table. The appropriate entry in the abbreviations table guides the interpretation of the information contained directly in the .debug_info section. This code is followed directly by a series of attribute values as follows:

"name"—an attribute whose value is a null-terminated string containing the full name of the corresponding function; and "low_PC" and "high_PC"—a pair of attributes whose values encode the contiguous or non-contiguous address ranges, respectively, of the machine instructions or object code segment generated for the corresponding function.

Note that, before merging, the (low_PC, high_PC) pair of the function b(x) is (L3, L4) and the (low_PC, high_PC) pair of the function c(y) is (L31, L41) because the compiler has not yet determined if the two functions have the same object code or not and both object code segments exist. The two DIEs 440 and 445 have different location identifiers, "L5" for DIE 440 and "L6" for DIE 445, because they represent two different entities in the source code of the program.

For the newly-generated object code segment, the compiler searches the previously-compiled object codes for a pre-existing code segment that is identical to the newly-generated one (215). If a pre-existing one is found (220, yes), the compiler updates the function's corresponding DIE. For example, in the DIE 445 (FIG. 4B), the low_PC value L31 is replaced with L3 and the high_PC value L41 is replaced with L4. As a result, the DIE 445 also points to the object code segment of the function b(x) (225). By doing so, the two functions' object code segments merge into one that was originally generated for the function b(x) and the newly-generated object code segment for the function c(y) can be discarded. If no pre-existing one is found (220, no), the compiler will not modify the function's corresponding DIE 445.

Note that the compiler performs the aforementioned operations for each function until it processes the last function (230, yes) in the last source code file (235, yes). But, referring again to the example of FIGS. 4A and 4B, because the two object code segments are merged, it is impossible for the debugger to determine whether a breakpoint associated with a PC whose value is between the low_PC value "L3" and high_PC value "L4" should correspond to the source code 400 of function b(x) or the source 405 of function c(y).

Figure 2B:
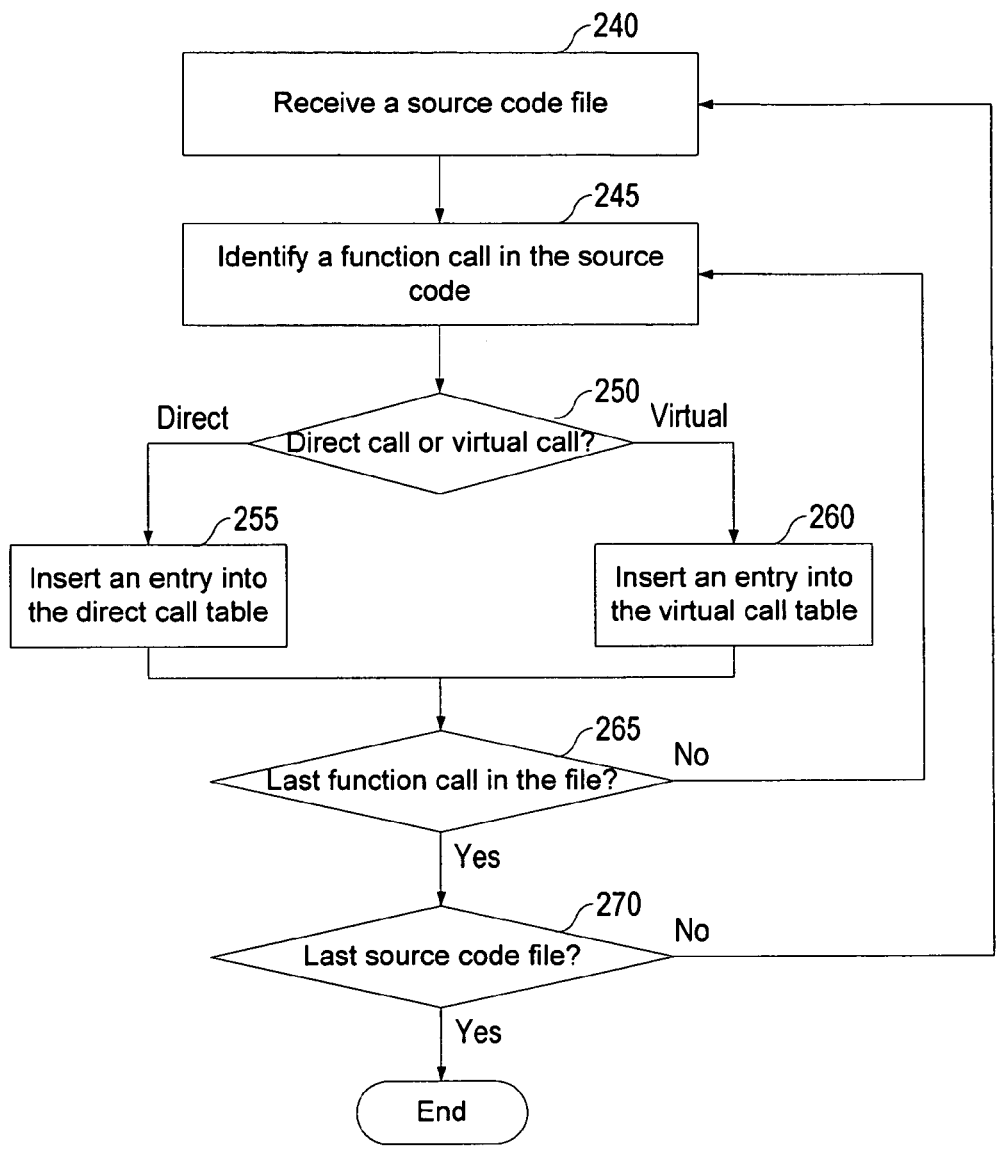
FIG. 2B is a flow chart of a process for generating call table entries for merged functions in accordance with some embodiments.

FIG. 2B is a flow chart of a process for generating call table entries for merged functions. In some embodiments, the process of generating the call table entries is performed by the compiler.

Upon receiving a source code file (240), the compiler identifies a call site or a function call that invokes a callee or a function (245). The compiler determines whether the function call is a direct call or a virtual call (250). If the function call is a direct call, the compiler inserts an entry into a direct call table within the .debug_dcall section of the corresponding compilation unit (255). If the function call is a virtual call, the compiler inserts an entry into a virtual call table within the .debug_vcall section of the corresponding compilation unit (260).

In some embodiments, an exemplary direct call table 425 shown in FIG. 4B has the following format:
  call_site 430—an address-sized attribute that contains a pointer to a respective call site that is responsible for directly invoking a function; and
  callee_die 435—an attribute (e.g., an address pointer) that is used to resolve the location of the debug information entry of the function in the .debug_info section.

For a merged direct call, the debugger consults the direct call table while unwinding a call stack of the corresponding program to identify the entry in the direct call table that corresponds to the merged direct call and therefore the call_site attribute. A call stack is a dynamic stack data structure that stores information about the active functions or subroutines of a computer program. A call stack is often used for keeping track of the point to which each active function should return control when it finishes executing. In some embodiments, the call_site attribute is an address following the call instruction in the program, to which the callee returns.

In some embodiments, separate call tables are generated for direct calls and virtual calls because they have different behaviors at compile time. For a direct call, the compiler knows exactly which function is being invoked and can therefore provide a specific reference to the function's DIE in the .debug_info section. As shown in FIG. 4B, the call_site value for the call to the function b(x) is L1 and the address of the DIE of the function b(x) is L5.

But in the object-oriented programming paradigm (e.g., C++ or Java), a virtual function or method in a class can be overridden within an inheriting class by a function or method with the same signature. For a virtual call, the compiler is not certain which function is being invoked because the function being called depends on the actual type of the object at runtime. But in the case of virtual call, the compiler knows the pointer of the object and therefore the virtual function (or method) table, i.e., vtable, of the type of the object.

FIGS. 5A to 5C depict an example of generating debugging information and a virtual call table for merged functions in a C++ program in accordance with some embodiments. As shown in FIG. 5A, class A has a virtual function A::f( ) 500, class B has a virtual function B::g( ) 505, and class C, which inherits class A, has its own function C::f( ) 510 that overrides the virtual function A::f( ) 500. When invoked by the statements 515, 520, and 525 in the main function, the three functions each output the following phrase through a standard I/O device (e.g., monitor) of a computer:

"Hello World!"

In other words, the three functions should have the same object code. But initially, the compiler may generate three copies of the object code, one for each function, and store them at different locations in the memory, i.e., (L1A, L2A) for A::f( ), (L1B, L2B) for B::g( ), and (L1C, L2C) for C::f( ). As shown in FIG. 5B, the compiler generates three vtables 535, 540, and 545, one vtable per class type. Each vtable contains the addresses of the corresponding object's dynamically-bound functions. In this example, the dynamically-bound functions for the objects of class types "A," "B" and "C" are, respectively, A::f( ), B::g( ), and C::f( ). Note that the function f( ) in the class C has overridden the function f( ) it inherits from class A. The main function of the program includes three objects, "a," "b" and "c," each having a pointer to the respective vtable.

As shown in FIG. 5C, the compiler generates three debugging information entries for the three classes used in the program, 555 for class A, 560 for class B, and 565 for class C. Each entry includes at least the following attributes:
  "class_name"—an attribute whose value is a null-terminated string containing the name of the corresponding class;
  "function_name"—an attribute whose value is a null-terminated string containing the function of a dynamically-bound function associated with the class;
  "low_PC" and "high_PC"—a pair of attributes whose values encode the contiguous or non-contiguous address ranges, respectively, of the machine instructions or object code segment generated for the corresponding function; and
  "vtable_elem_loc"—an attribute whose value contains a location description yielding the address of the slot for the function within the virtual function table for the enclosing class.

As noted above, because the three functions have the same object code, the compiler therefore discards two copies and assigns the same (low_PC, high_PC) pair to the three DIEs. In order to disambiguate the three different functions in the source code, the compiler generates a virtual call table and inserts three entries into the table, each entry corresponding to a virtual call in the main function. In some embodiments, an exemplary virtual call table 550 shown in FIG. 5C has the following format:
  call_site—an address-sized attribute that contains a pointer to a respective call site;
  vtable_loc—a location descriptor that evaluates to the location of the vtable used for the virtual call;
  callee_die—an attribute (e.g., an address pointer) that is used to resolve the location of the debug information entry of the function in the .debug_info section; and
  vtable_elem_loc—an index that evaluates to the address of the corresponding slot within the vtable used for the virtual function call.

Note that the value of the "callee_die" attribute directly points to the debugging information entry of a corresponding class type. This attribute is helpful to locate the debugging information entry of an object (e.g., the object "a" in the main function) if the compiler determines that the object is no longer in use after a certain statement in the source code (e.g., the statement "a->f( );" 515 as shown in FIG. 5A). In some embodiments, the compiler uses, e.g., scratch registers to store the object and its vtable, whose values may be overwritten during the execution of the called function A::f( ). In this case, the "vtable_loc" attribute for the corresponding call_site value L1 in the virtual call table 550 may not have a pointer to the object "a" in the main function. Therefore, it is not possible to locate the corresponding vtable through stack unwinding. As a backup option, the virtual call table 550 stores the location of the debugging information entry of the class A itself under the "callee_die" attribute. If the vtable_loc attribute is empty, the debugger will assume that the callee_die attribute points to the correct debugging information entry and rely on the entry to determine the source code location corresponding to the call site. Although this approach does not guarantee that the entry is always correct, it does limit the possible candidate source code segments for the debugger to consider. In some embodiments, knowing even the base class's debugging information entry is sufficient to disambiguate a merged function. Similar to the process describe above in connection with FIG. 2B, the compiler performs the aforementioned operations for each function until it processes the last function (265, yes) in the last source code file (270, yes).

Figure 3A:
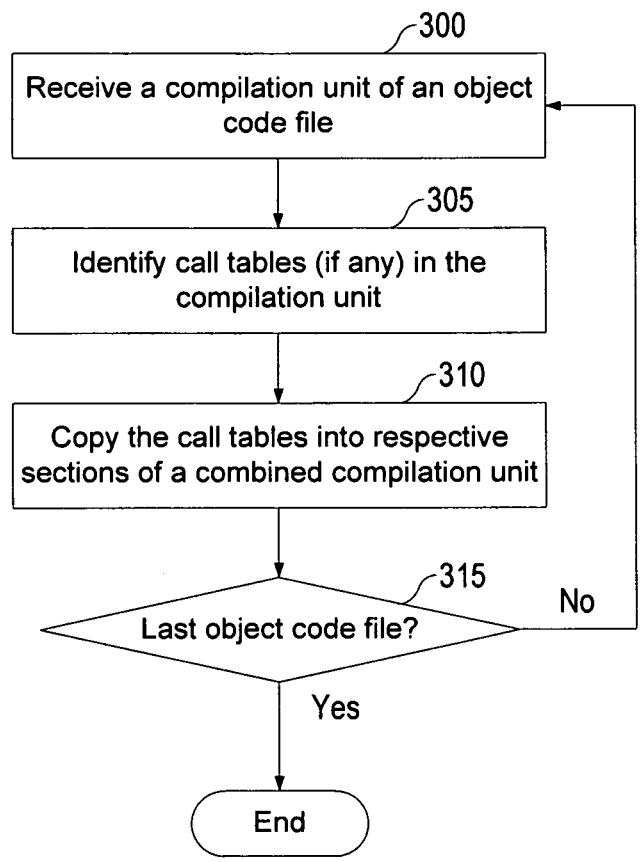
FIG. 3A is a flow chart of a process for combining call tables associated with different object code files in accordance with some embodiments.

FIG. 3A is a flow chart of a process for combining call tables associated with different object code files in accordance with some embodiments. For illustration, it is assumed that this process is performed by a compiler, such as the compiler 1020 of FIG. 10.

After receiving a compilation unit of an object file (300), the compiler identifies whether the compilation unit includes a direct call table in the .debug_dcall section or a virtual call table in the .debug_vcall section (305). For the identified call tables, the compiler copies them into the respective sections of a combined compilation unit, i.e., the direct call table into the combined .debug_dcall section and the virtual call table into the combined .debug_vcall section. The compiler repeats this process until the last object code file is processed (315, yes).

Figure 3B:
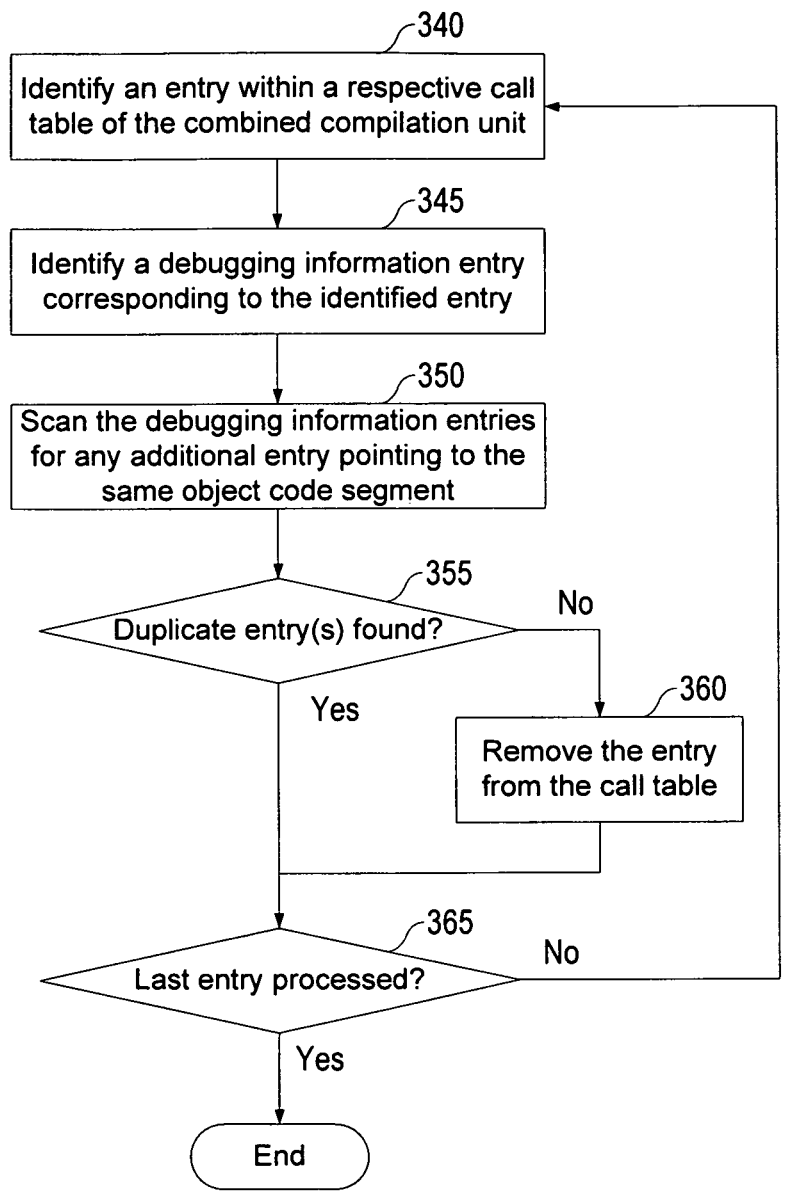
FIG. 3B is a flow chart of a process for eliminating entries from the combined call table that correspond to non-merged functions in accordance with some embodiments.

FIG. 3B is a flow chart of a process for eliminating entries from the combined call table that correspond to non-merged functions in accordance with some embodiments. For illustration, it is assumed that this process is performed by a linker. But the compiler or another tool can also perform the operations as described below. In some embodiments, this process is optional and can be skipped.

The linker identifies an entry within a respective call table (e.g., the direct call table 450 of FIG. 4C) of a combined compilation unit (340). The linker then identifies a debugging information entry in the combined .debug_info section that corresponds to the identified call table entry (345). Next, the linker scans the debugging information entries for any additional entry that points to the same object code segment (350). If no additional debugging information entry is found (355, no), the linker assumes that there is no function merge for the direct call and therefore removes the identified call table entry from the call table (360). The linker performs this examination process until the last entry is processed (365, yes).

FIG. 4C depicts two direct call tables. The direct call table 450 is the one the compiler creates at compile time such that there is an entry in the table for every direct call in the program. The direct call table 460 is the one after the linker eliminates the entry whose call_site value is "L2" from the table because this entry has no duplicates in the call table and therefore would not cause ambiguity for a debugger.

Figure 6:
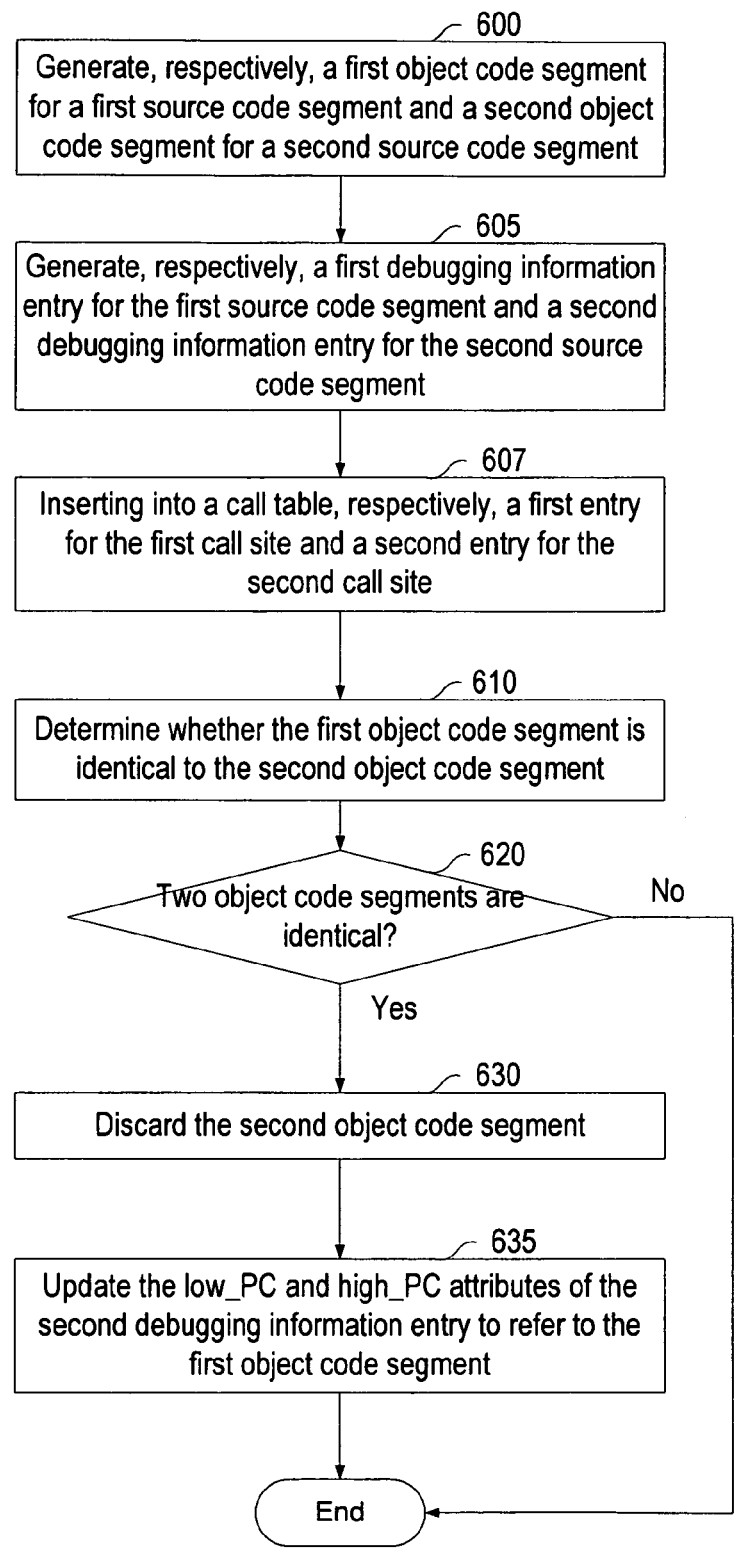
FIG. 6 is a flow chart of a process for optimizing the object code of a program by merging functions at compile time in accordance with some embodiments.

FIG. 6 is a flow chart of a process for optimizing the object code of a program by merging functions at compile time in accordance with some embodiments.

At compile time, the compiler generates, respectively, a first object code segment for a first source code segment and a second object code segment for a second source code segment (600). In some embodiments, the first source code segment is invoked by a first call site and the second first source code segment is invoked by a second call site in the program.

The compiler then generates in a compilation unit of the program, respectively, a first debugging information entry for the first source code segment and a second debugging information entry for the second source code segment (605). The compiler inserts into a call table in the compilation unit, respectively, a first entry for the first call site and a second entry for the second call site (607). In some embodiments, the first entry includes information for locating the first call site within a call stack of the program and information for locating the first debug information entry. The second entry includes information for locating the second call site within the call stack and information for locating a second debugging information entry.

The compiler (typically including the linker) then determines whether the first object code segment is identical to the second object code segment (610). If so (620, yes), the compiler then discards the second object code segment (630) and updates the low_PC and high_PC attributes of the second debugging information entry to refer to the first object code segment (635). As a result, both the first and second debugging information entries include information for locating the first object code segment. The compiler repeats the aforementioned process until the last call_site attribute is processed. In some embodiments, the call table and the debugging information entries are available for a debugger or a profiler such that an operation within the first object code segment at runtime is uniquely associated with one of the first and second source code segments by a corresponding entry in the call table.

Function Unwinding at Debugging

One of the applications of the direct or virtual call tables is to identify which source code statement corresponds to a particular location in the executable if multiple source code segments (e.g., multiple functions) are merged into the same object code segment at compile time. This application is very useful for program debugging. When a developer runs a program under a debugger, some common operations the developer may want to perform include: setting a breakpoint to stop the debugger at a particular point in the source code, either by specifying the line number or a function name. When this breakpoint is hit, then the developer may like to display the values of local or global variables, or the arguments to the function. Displaying the call stack lets the developer know how the program arrived at the breakpoint in cases where there are multiple execution paths. After reviewing this information, the developer can ask the debugger to continue execution of the program under test. But if multiple functions are merged into the same object code, the debugger may be unable to uniquely link a PC within the object code to the source code of a particular function without consulting the call tables. For illustration, two embodiments of disambiguating a PC within a merged function of an executable using the direct or virtual call table at debugging time are described below.

Figure 7:
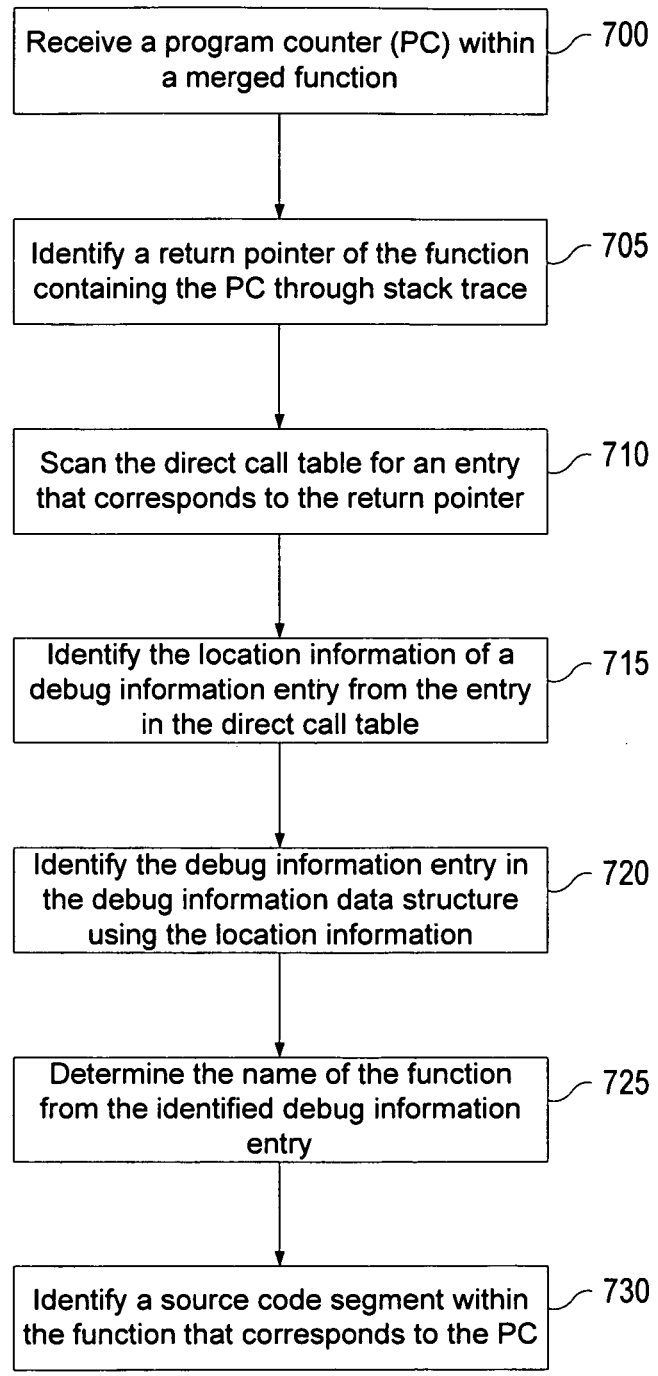
FIG. 7 is a flow chart of a process for debugging a merged function within a program using a direct call table of the program in accordance with some embodiments.

FIG. 7 is a flow chart of a process for debugging a merged function within a program using a direct call table of the program in accordance with some embodiments.

Upon receiving a PC within a merged function (700), the debugger identifies a return pointer of the function that contains the PC through stack trace (705). The debugger then scans the direct call table within the program's compilation unit for an entry that corresponds to the return pointer (710). From the call table entry, the debugger identifies the location information of a debugging information entry (715). Referring to the example shown in FIGS. 4A to 4C, assuming that the return pointer is "L21" in the call stack, the debugger then identifies an entry in the direct call table 425 whose call_site attribute value is L21 and therefore the address of the debugging information entry, "L6."

Using the location information of the DIE, i.e., L6, the debugger identifies the debugging information entry in the .debug_info section of the program's compilation unit (720). From the debugging information entry, the debugger determines (725) that the name of the function invoked by the corresponding call site is "c" and its (low_PC, high_PC) pair is (L3, L4). (Note that the compiler has replaced the original values (L31, L41) with (L3, L4) at compile time.) From the name of the function, the debugger can determine that the source code segment of the function that corresponds to the PC is the function c(y) 405, not the function b(x) 400.

In some embodiments, a user of the debugger can tell which two or more functions in the source are merged into one in the object code from comparing the (low_PC, high_PC) pairs of the functions' corresponding debugging information entries. For example, two functions are determined to be merged together if they have overlapping low_PC/high_PC ranges.

Figure 8:
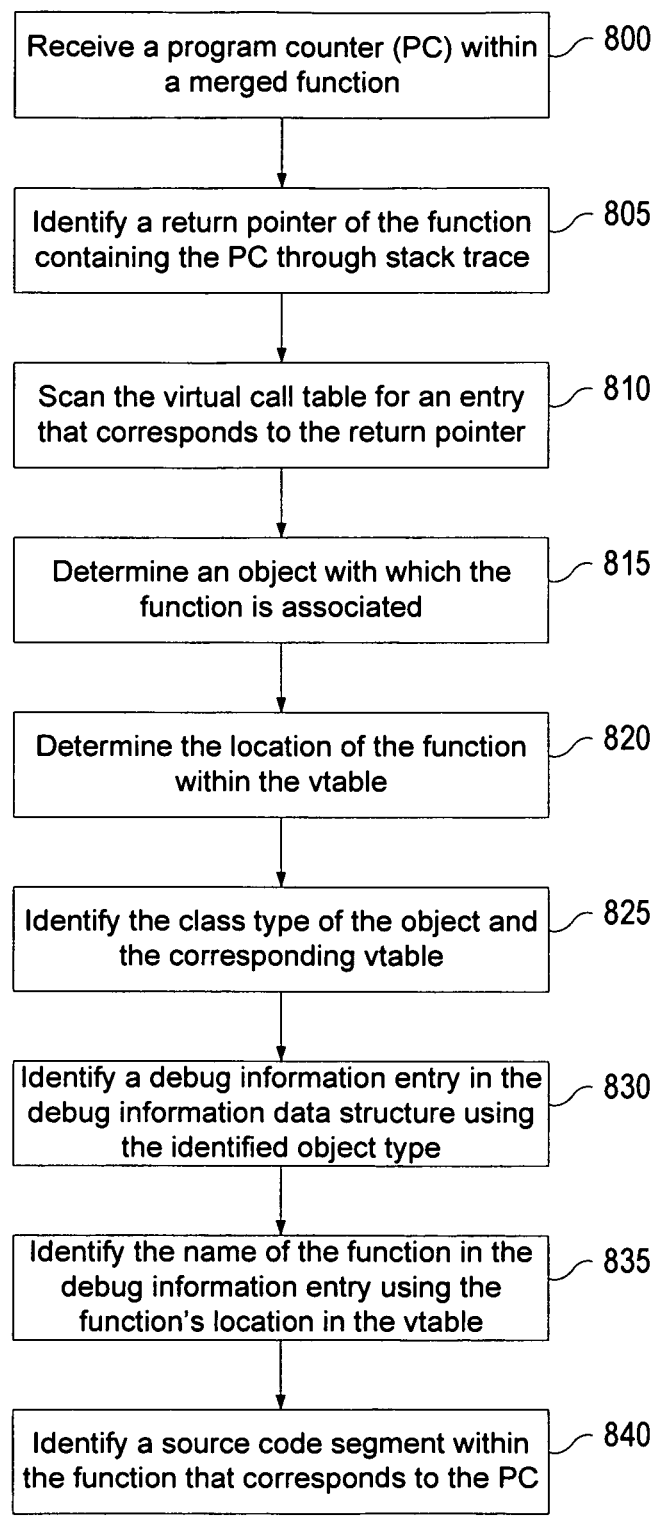
FIG. 8 is a flow chart of a process for debugging a merged function within a program using a virtual call table of the program in accordance with some embodiments.

FIG. 8 is a flow chart of a process for debugging a merged function within a program using a virtual call table of the program in accordance with some embodiments.

Upon receiving a PC within a merged function (800), the debugger identifies a return pointer of the function that contains the PC through stack trace (805). The debugger then scans the virtual call table within the program's compilation unit for an entry that corresponds to the return pointer (810). From the call table entry, the debugger determines an object with which the merged function is associated (815) and the location of the merged function within the corresponding vtable (820). Referring to the example shown in FIGS. 5A to 5C, assuming that the return pointer is "L2" in the call stack, the debugger then identifies an entry in the direct call table 550 whose call_site attribute value is L2. As shown in the table 550, the object associated with the call site is "b" and the "vtable_elem_loc" attribute of the merged function in the vtable is 0.

From the object "b," the debugger identifies the class type of the object, i.e., class B, and the corresponding vtable 540 (825). Using the class type information, the debugger further identifies a debugging information entry in the .debug_info section of the compilation unit (830). From the debugging information entry, the debugger determines the name of the merged function in the source code "g" using the class name "B" and the "vtable_elem_loc" attribute of the function in the vtable (835). Finally, the debugger identifies the source code of the function B::g( ) 505 that corresponds to the PC.

Figure 9:
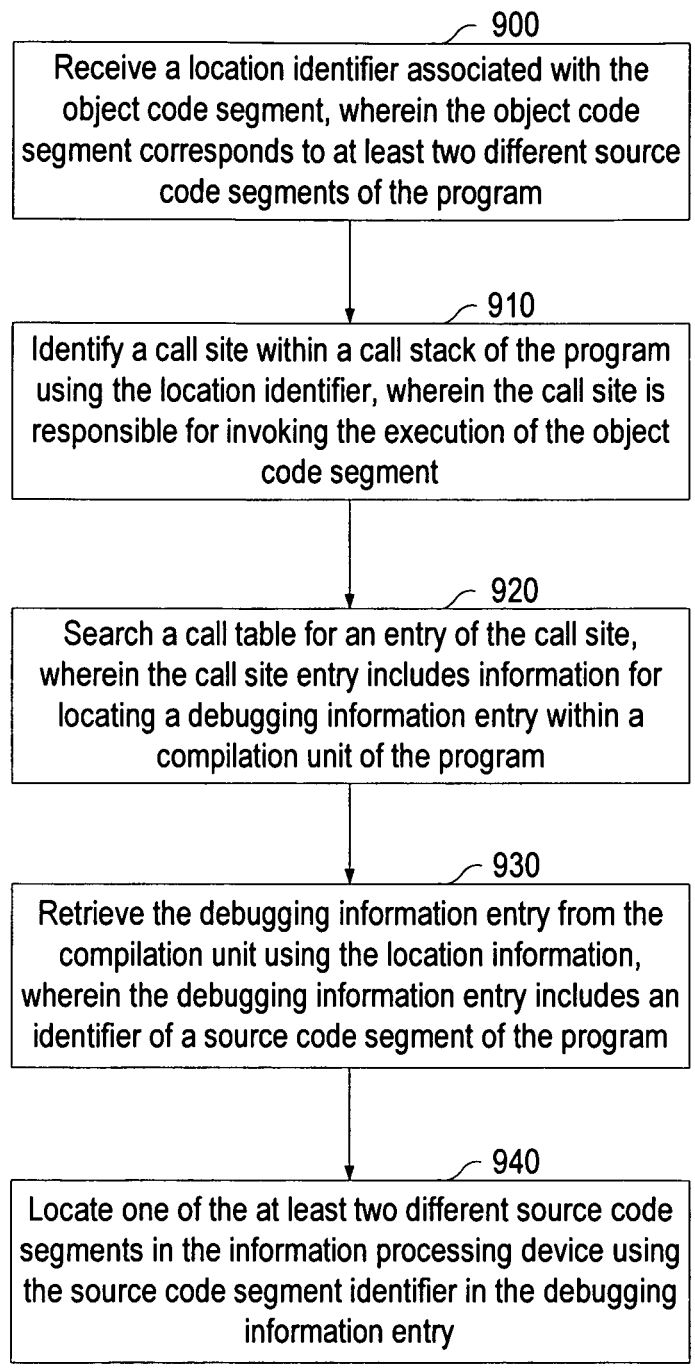
FIG. 9 is a flow chart of a process for unwinding merged functions within a program using call tables of the program at runtime in accordance with some embodiments.

FIG. 9 is a flow chart of a process for unwinding merged functions within a program using call tables of the program at runtime in accordance with some embodiments.

While executing the object code segment on an information processing device such as a desktop or laptop computer, an application (e.g., a debugger) receives a location identifier (e.g., a PC) associated with the object code segment (900). In some embodiments, the object code segment corresponds to at least two different source code segments of the program. The object code segment may correspond to a direct function call or virtual function call in the program. The debugger identifies a call site within a call stack of the program using the location identifier (910). In some embodiments, the call site is responsible for invoking the execution of the object code segment. The debugger scans a call table for an entry of the call site (920). In some embodiments, the call site entry includes information for locating a debugging information entry within a compilation unit of the program. The debugger retrieves the debugging information entry from the compilation unit using the location information (930). In some embodiments, the debugging information entry includes an identifier of a source code segment of the program. The debugger locates one of the at least two different source code segments in the information processing device using the source code segment identifier in the debugging information entry (940).

In some embodiments, the debugger scans both the direct call table and the virtual call table for a given PC using the aforementioned processes until an entry is found in one of the two call tables or no entry is found at all.

Figure 10:
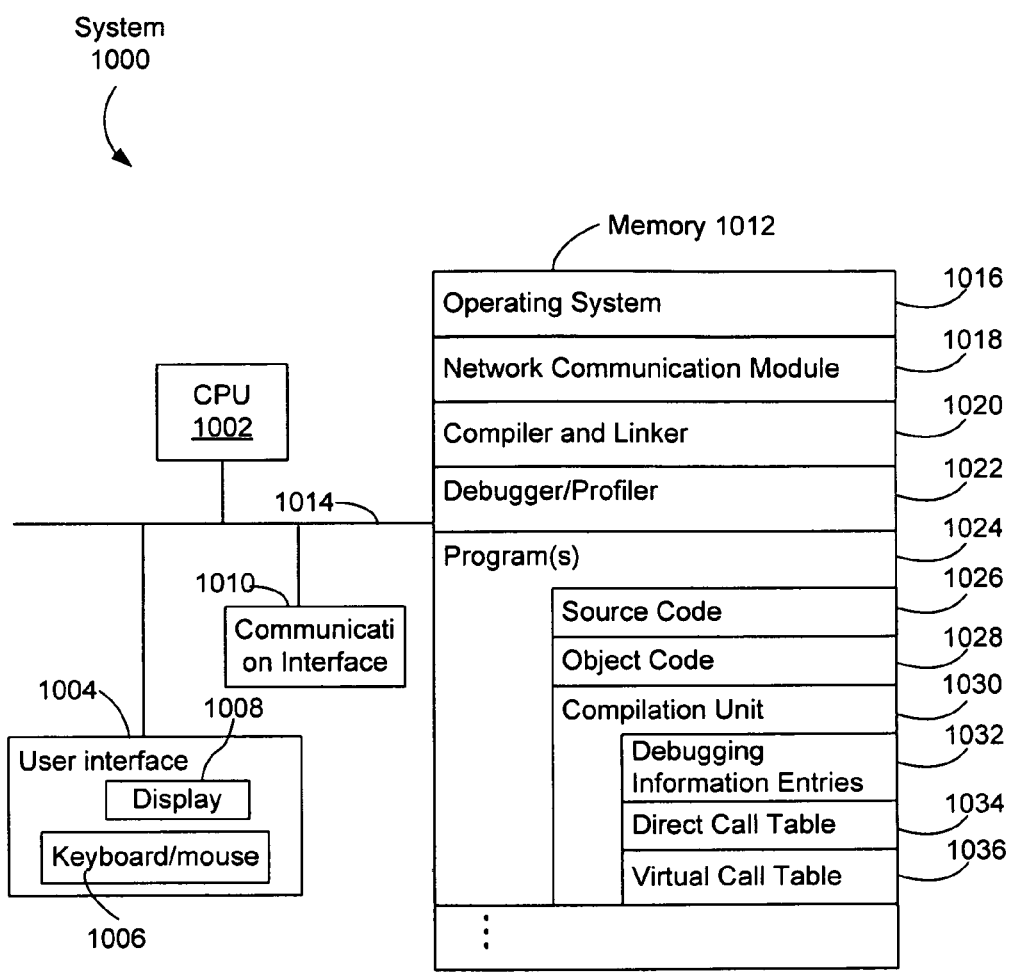
FIG. 10 is a block diagram of a system for code optimization and debugging in accordance with some embodiments.

Referring to FIG. 10, an embodiment of a computer system 1000 that implements the methods described above includes one or more processing units (CPU's) 1002, one or more network or other communications interfaces 1010, memory 1012, and one or more communication buses 1014 for interconnecting these components. In some embodiments, fewer and/or additional components, modules or functions are included in the computer system 1000. The communication buses 1014 may include circuitry (sometimes called a chipset) that interconnects and controls communications between system components. The computer system 1000 may optionally include a user interface 1004. In some embodiments, the user interface 1004 includes a display device 1008 and/or a keyboard 1006, but other configurations of user interface devices may be used as well. Memory 1012 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 1012 may optionally include mass storage that is remotely located from CPU's 1002. Memory 1012, or alternately the non-volatile memory device(s) within memory 1012, comprises a computer readable storage medium. Memory 1012 stores the following elements, or a subset of these elements, and may also include additional elements:

- an operating system 1016 that includes procedures for handling various basic system services and for performing hardware dependent tasks;
- a network communication module (or instructions) 1018 that is used for connecting the computer system 1000 to other computers via the one or more communications network interfaces 1010 and one or more communications networks, such as the Internet, other wide area networks, local area networks, metropolitan area networks, and so on;
- a compiler and linker application 1020 for processing the source code of a program written in a particular language such as C, C++, Java, etc. and generating the call tables and debugging information entries in the compilation unit of the program;
- a debugger/profiler 1022 for disambiguating a merged function in a program using the call tables and debugging information entries in the compilation unit of the program; and
- one or more programs 1024, each program further including source code 1026, object code 1028, and compilation unit 1030, and each compilation unit further including debugging information entries 1032, a direct call table 1034 and a virtual call table 1036.

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for optimizing the object code of an object-oriented program, comprising:

at a computer system including one or more processors and memory storing one or more programs, the one or more processors executing the one or more programs to perform the operations of:

generating, respectively, a first object code segment for a first virtual function and a second object code segment for a second virtual function, wherein the first virtual function and the second virtual function are two distinct parts of the object-oriented program and the first virtual function is invoked by a first call site and the second virtual function is invoked by a second call site in the object-oriented program;

determining that the first object code segment is identical to the second object code segment although the first virtual function is not identical to the second virtual function;

generating in a compilation unit of the object-oriented program, respectively, a first debugging information entry for the first virtual function and a second debugging information entry for the second virtual function, wherein both the first and second debugging information entries include information for locating the first object code segment; and inserting into a virtual call table in the compilation unit, respectively, a first entry for the first call site and a second entry for the second call site, wherein the first entry includes information for locating the first call site within a call stack of the object-oriented program, the information further including a first return pointer of the first virtual function, and information for locating the first debugging information entry, the information further including a first address pointer to the first debugging information entry associated with the virtual function table, and the second entry includes information for locating the second call site within the call stack, the information further including a second return pointer of the second virtual function, and information for locating a second debugging information entry, the information further including a second address pointer to the second debugging information entry associated with the virtual function table, such that an operation within the first object code segment at runtime is uniquely associated with a respective one of the first and second virtual functions by a corresponding entry in the call table.

2. The method of claim 1, further comprising: for a selected entry in the call table, identifying a debugging information entry in the compilation unit and its associated object code location information;

searching for another debugging information entry in the compilation unit that has the same object code location information;

eliminating the selected entry from the call table if said searching returns none; and repeating said operations until after the last entry in the call table is processed.

3. The method of claim 2, wherein a linker is configured to perform said operations at link time.

4. The method of claim 1, wherein there is at least one difference between the first virtual function and the second virtual function.

5. The method of claim 4, wherein the at least one difference includes different variable names.

6. The method of claim 1, wherein each of the first and second entries includes a location descriptor of a virtual function table of an object with which the virtual function is associated, and an index of the virtual function within the virtual function table.

7. The method of claim 6, wherein the object includes an address pointer to the virtual function table associated with the object and the virtual function table includes information for locating a debugging information entry associated with the virtual function.

8. A system for processing an object-oriented computer program, comprising:

one or more central processing units for executing programs; and memory to store data and to store one or more programs to be executed by the one or more central processing units, the one or more programs including instructions for:

generating, respectively, a first object code segment for a first virtual function and a second object code segment for a second virtual function, wherein the first virtual function and the second virtual function are two distinct parts of the object-oriented program and the first virtual function is invoked by a first call site and the second virtual function is invoked by a second call site in the object-oriented program;

determining that the first object code segment is identical to the second object code segment although the first virtual function is not identical to the second virtual function;

generating in a compilation unit of the object-oriented program, respectively, a first debugging information entry for the first virtual function and a second debugging information entry for the second virtual function, wherein both the first and second debugging information entries include information for locating the first object code segment; and inserting into a virtual call table in the compilation unit, respectively, a first entry for the first call site and a second entry for the second call site, wherein the first entry includes information for locating the first call site within a call stack of the object-oriented program, the information further including a first return pointer of the first virtual function, and information for locating the first debugging information entry, the information further including a first address pointer to the first debugging information entry associated with the virtual function table, and the second entry includes information for locating the second call site within the call stack, the information further including a second return pointer of the second virtual function, and information for locating a second debugging information entry, the information further including a second address pointer to the second debugging information entry associated with the virtual function table, such that an operation within the first object code segment at runtime is uniquely associated with a respective one of the first and second virtual functions by a corresponding entry in the call table.

9. The system of claim 8, wherein the one or more programs include instructions for:

for a selected entry in the call table,
  identifying a debugging information entry in the compilation unit and its associated object code location information;
  searching for another debugging information entry in the compilation unit that has the same object code location information;
  eliminating the selected entry from the call table if said searching returns none; and
  repeating said operations until after the last entry in the call table is processed.

10. The system of claim 8, wherein there is at least one difference between the first virtual function and the second virtual function.

11. The system of claim 10, wherein the at least one difference includes different variable names.

12. The system of claim 8, wherein each of the first and second entries includes a location descriptor of a virtual function table of an object with which the virtual function is associated, and an index of the virtual function within the virtual function table.

13. The system of claim 12, wherein the object includes an address pointer to the virtual function table associated with the object and the virtual function table includes information for locating a debugging information entry associated with the virtual function.

14. A non-transitory computer readable-storage medium storing one or more programs for execution by one or more processors of a respective server system, the one or more programs comprising instructions for:
  generating, respectively, a first object code segment for a first virtual function and a second object code segment for a second virtual function, wherein the first virtual function and the second virtual function are two distinct parts of an object-oriented program and the first virtual function is invoked by a first call site and the second virtual function is invoked by a second call site in the object-oriented program;
  determining that the first object code segment is identical to the second object code segment although the first virtual function is not identical to the second virtual function;
  generating in a compilation unit of the object-oriented program, respectively, a first debugging information entry for the first virtual function and a second debugging information entry for the second virtual function, wherein both the first and second debugging information entries include information for locating the first object code segment; and
  inserting into a virtual call table in the compilation unit, respectively, a first entry for the first call site and a second entry for the second call site, wherein the first entry includes information for locating the first call site within a call stack of the object-oriented program, the information further including a first return pointer of the first virtual function, and information for locating the first debugging information entry, the information further including a first address pointer to the first debugging information entry associated with the virtual function table, and the second entry includes information for locating the second call site within the call stack, the information further including a second return pointer of the second virtual function, and information for locating a second debugging information entry, the information further including a second address pointer to the second debugging information entry associated with the virtual function table, such that an operation within the first object code segment at runtime is uniquely associated with a respective one of the first and second virtual functions by a corresponding entry in the call table.

15. The non-transitory computer readable-storage medium of claim 14, wherein the one or more programs include instructions for: for a selected entry in the call table,
  identifying a debugging information entry in the compilation unit and its associated object code location information;
  searching for another debugging information entry in the compilation unit that has the same object code location information;
  eliminating the selected entry from the call table if said searching returns none; and
  repeating said operations until after the last entry in the call table is processed.

16. The non-transitory computer readable-storage medium of claim 14, wherein each of the first and second entries includes a location descriptor of a virtual function table of an object with which the virtual function is associated, and an index of the virtual function within the virtual function table.

17. The non-transitory computer readable-storage medium of claim 16, wherein the object includes an address pointer to the virtual function table associated with the object and the virtual function table includes information for locating a debugging information entry associated with the virtual function.

* * * * *